US012803496B2

(12) United States Patent
Scrofani

(10) Patent No.: US 12,803,496 B2
(45) Date of Patent: Nov. 17, 2026

(54) PORTABLE SOLAR CHARGING UNIT

(71) Applicant: Justin Scrofani, Honolulu, HI (US)

(72) Inventor: Justin Scrofani, Honolulu, HI (US)

( * ) Notice: Subject to any disclaimer, the term of this patent is extended or adjusted under 35 U.S.C. 154(b) by 0 days.

(21) Appl. No.: 18/953,031

(22) Filed: Nov. 19, 2024

(65) Prior Publication Data

US 2025/0167725 A1 May 22, 2025

Related U.S. Application Data

(60) Provisional application No. 63/601,638, filed on Nov. 21, 2023.

(51) Int. Cl.
*H02S 30/20* (2014.01)
*B60L 53/16* (2019.01)
*B60L 53/51* (2019.01)
*H02S 20/30* (2014.01)
*H02S 40/32* (2014.01)

(52) U.S. Cl.
CPC .............. *H02S 30/20* (2014.12); *B60L 53/16* (2019.02); *B60L 53/51* (2019.02); *H02S 20/30* (2014.12); *H02S 40/32* (2014.12); *B60L 2210/44* (2013.01)

(58) Field of Classification Search
None
See application file for complete search history.

(56) References Cited

U.S. PATENT DOCUMENTS 6,188,197 B1 * 2/2001 Watanabe ............... H02S 40/38 320/101
2006/0196535 A1 * 9/2006 Swanson ............... H10F 77/315 136/244
2014/0159489 A1 * 6/2014 Clough ................... H02S 30/20 136/251
2018/0331652 A1 * 11/2018 Okawa .................... H02S 40/32
2018/0367083 A1 * 12/2018 Wang ...................... H02J 3/381
2021/0288607 A1 * 9/2021 Moslehi ................ H10F 10/148
2022/0356726 A1 * 11/2022 Venter ..................... H02S 20/23
2022/0379734 A1 * 12/2022 Kim ........................ B60K 16/00
2023/0158914 A1 * 5/2023 Lin ......................... B60L 53/51 320/101

FOREIGN PATENT DOCUMENTS

BR 102017008561 A2 * 11/2018 ............. B60R 11/00

OTHER PUBLICATIONS

Machine translation of BR102017008561A2 (Year: 2018).*

* cited by examiner

*Primary Examiner* — Ryan S Cannon

(57) ABSTRACT

A portable solar charging unit includes a flexible solar panel having one or more solar cells, an inverter circuit operatively coupled to the flexible solar panel, and a power connector operatively coupled with the inverter circuit. The inverter circuit is configured to convert direct current (DC) to alternating current (AC) and the power connector is configured to mate with a charging port of an electric vehicle. A method includes forming a flexible solar panel including one or more solar cells, connecting an inverter circuit to the flexible solar panel, and connecting a power connector to the inverter circuit, the power connector configured to mate with a charging port of an electric vehicle.

18 Claims, 8 Drawing Sheets

PORTABLE SOLAR CHARGING UNIT

RELATED APPLICATION

The present application claims the benefit under 35 U.S.C. § 119(e) of U.S. Provisional Patent Application No. 63/601,638 filed Nov. 21, 2023, which is incorporated by reference herein.

TECHNICAL FIELD

Some embodiments of the present disclosure relate, in general, to a portable solar charging apparatus. Some embodiments relate to a method of forming or using a portable solar charging apparatus.

BACKGROUND

Electric vehicles (EVs) are increasing in popularity because they do not require gasoline to power their motors. They are easier to maintain, and they are quieter on the road as compared to their internal combustion (IC) engine counterparts. However, EVs depend on their battery packs to power their motors, and the drivable range of an EV depends on several factors such as the size of the battery pack, age of the battery pack, battery chemistry, etc. Batteries in EVs need to be charged from time to time because the batteries have a limited range (e.g., 250-450 miles). Charging the batteries can be time consuming even when using a 220 v outlet. For example, a sedan with a 350-mile range may take about 4-8 hours to charge from about 10% battery charge to about 90% battery charge.

SUMMARY

Some embodiments of the present disclosure described herein cover a portable solar charging unit includes a flexible solar panel having one or more solar cells, an inverter circuit operatively coupled to the flexible solar panel, and a power connector operatively coupled with the inverter circuit. The inverter circuit is configured to convert direct current (DC) to alternating current (AC). The power connector is configured to mate with a charging port of an electric vehicle.

Some embodiments of the present disclosure described herein cover a method of forming a portable solar charging unit. The method includes forming a flexible solar panel including one or more solar cells, connecting an inverter circuit to the flexible solar panel, and connecting a power connector to the inverter circuit, the power connector configured to mate with a charging port of an electric vehicle.

Some embodiments of the present disclosure described herein cover an apparatus including a solar panel having one or more solar cells, an inverter circuit operatively coupled to the solar panel, and a power connector operatively coupled with the inverter circuit. The power connector is directly or indirectly coupled to a battery pack of an electric vehicle. The inverter circuit is configured to convert direct current (DC) to alternating current (AC).

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
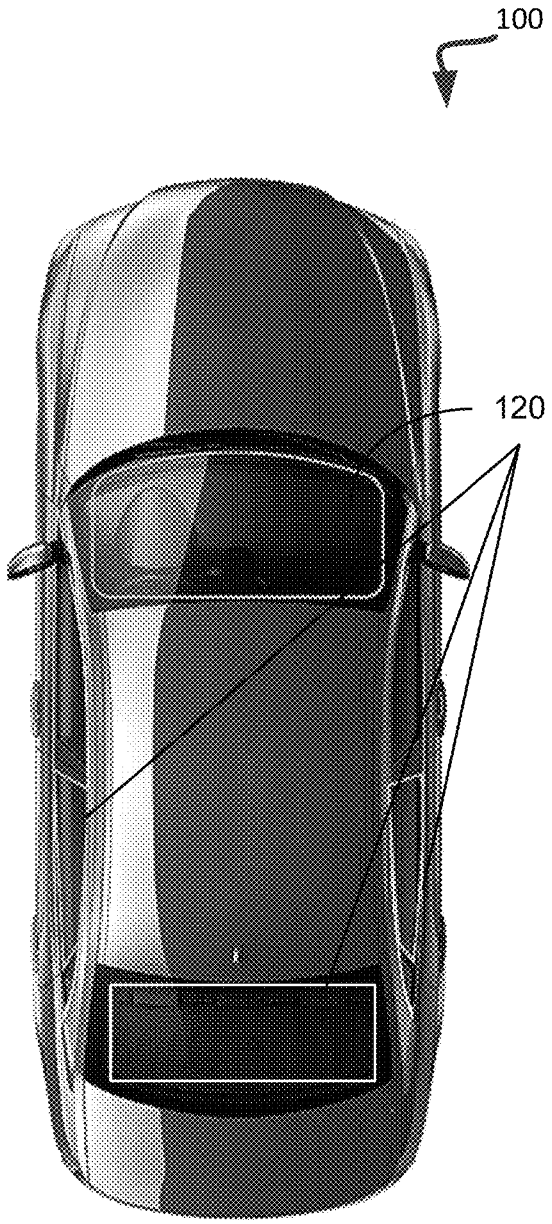
FIG. 1 depicts a top view of an EV with a portable solar charging unit, according to one or more embodiments.

Charging batteries in an EV can be time consuming even when a 220 v outlet is used. For example, a sedan with a 350-mile range may take about 4-8 hours to charge from about 10% battery charge to about 90% battery charge. Accordingly, while EVs provide many advantages over their IC engine counterparts, charging the batteries from time to time can be challenging. One way to charge the batteries would be to harvest solar energy from sunlight and using that energy to charge the batteries.

Accordingly, some embodiments in the disclosure relate to a portable solar charging unit that can be carried in an EV and can be used to harvest solar energy when the EV is in a parked position. The portable solar charging unit includes a flexible solar panel that can be unrolled from an already installed mounting bracket or it can be mounted onto the interiors of the windshield, side windows, and/or rear window of the EV using two or more mounting units. In one embodiment, the portable charging unit may include two or more support rods that may support the flexible solar panel when it is unrolled. The support rods may include retractable rollers that may retract the flexible solar panel onto one of the support rods when the panel is not in use. The retractable rollers may include one or more spring elements that may retract the flexible solar panel and wind it onto the support rod. In some embodiments, the portable solar charging unit may include a mounting bracket that may be permanently or temporarily fixed to the windshield or the rear window of the EV. The flexible solar panel may have a bellow structure such that it is unrolled when in use (when the EV is in park position) and folded up into a compact structure when not in use. The flexible solar panel may include one or more solar cells that may be made of a flexible material such as polyimide, polyurethane, polyvinyl chloride, or any other polymeric material, and may include circuitry that is also made of a flexible material. The portable charging unit further includes an inverter circuit and a power connector that is operatively coupled with the inverter circuit. The inverter circuit is configured to convert direct current (DC) to alternating current (AC). The power connector is configured to mate with a charging port of an electric vehicle, or the power connector may connect to a port that may be internal to the EV and that may be connected to the battery pack of the EV.

Some embodiments relate to a method of forming a portable solar charging unit. The method includes forming a flexible solar panel by connecting one or more solar cells in series or parallel and coating the assembled cells with one or more layers of a polymeric material. The method may further include connecting an inverter circuit to the flexible solar panel, and connecting a power connector to the inverter circuit. The power connector may be configured to mate with a charging port of an electric vehicle, or the power connector may connect to a port that may be internal to the EV and that may be connected to the battery pack of the EV. Some embodiments of the present disclosure relate to a method for regulating power generated and received from the portable solar charging unit disclosed in previous embodiments. Some embodiments relate to a method for storing power generated and received from the portable solar charging unit disclosed in previous embodiments.

FIG. 1 depicts a top view of an EV 100 with a portable solar charging unit, according to one or more embodiments. The portable solar charging unit may include one or more flexible solar panels 120, which may be installed on the front windshield, one or more side windows, and/or rear windshield of the EV 100. The flexible solar panels 120 may harvest solar energy from sunlight falling on the front windshield, one or more side windows, and/or rear windshield of the EV 100. Although EV 100 is illustrated as being a car in FIG. 1, the EV is not limited as such and may include motor vehicles such as sports utility vehicles (SUVs), recreational vehicles (RVs), minivans, trucks, transportation vehicles, or any vehicle that may be partially or fully powered by a battery pack. In some embodiments, the EV 100 may include a hybrid vehicle, which may use a battery pack to provide only part of the power consumed by the motors of the EV 100, and use an alternate source (e.g., gasoline) for providing the remaining power. The flexible solar panels 120 will be described in further detail with respect to FIG. 4 below.

Figure 2:
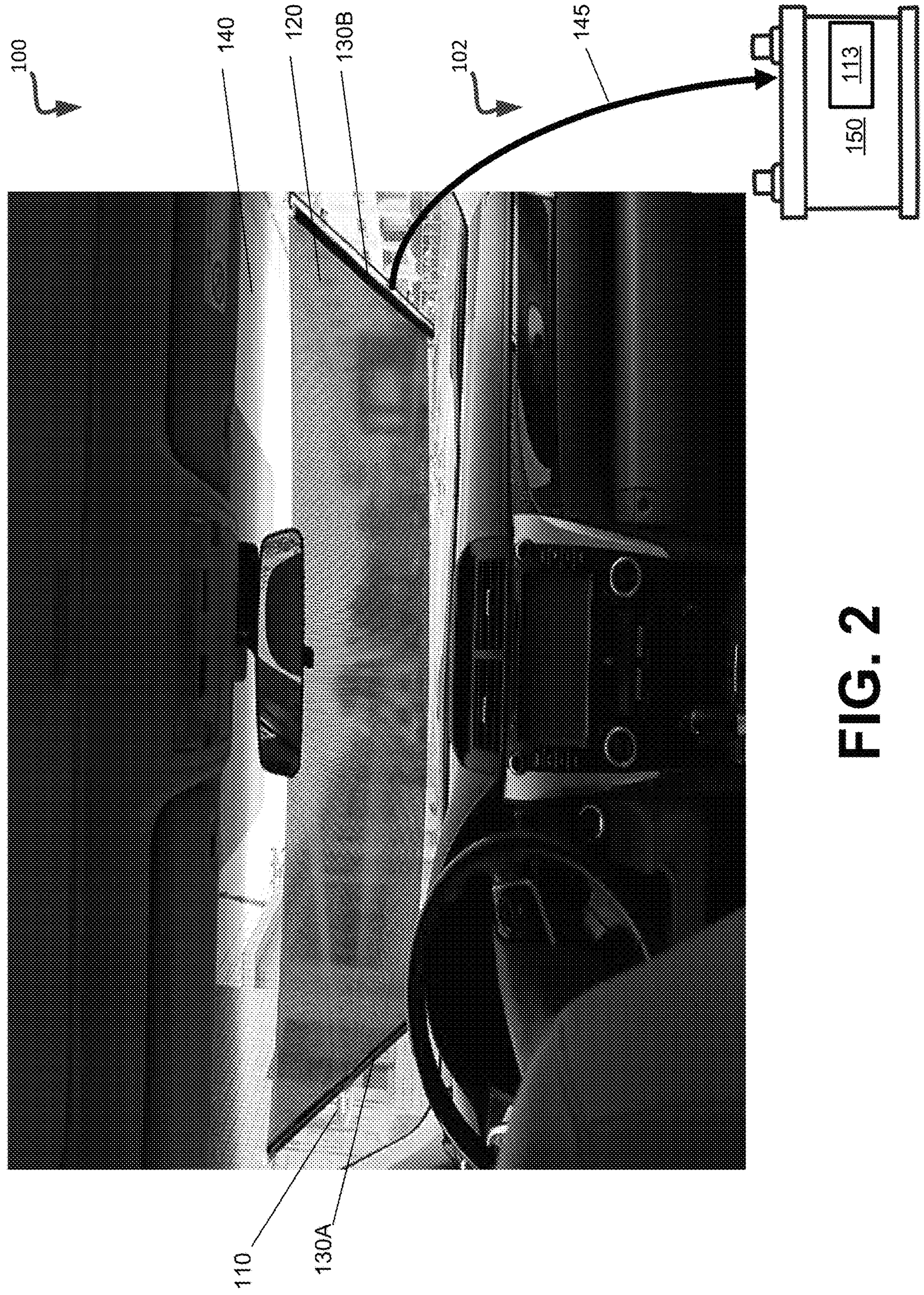
FIG. 2 depicts an inside view of an EV with a portable solar charging unit, according to one or more embodiments.

FIG. 2 depicts an inside view of an EV 100 with a portable solar charging unit 102, according to one or more embodiments. The portable solar charging unit 102 may include a flexible solar panel 120 including one or more solar cells (not shown). At least the flexible solar panel 120 of the portable solar charging unit 102 may be mounted on an interior of a front windshield 140 of the EV 100 using a pair of support rods 130 and one or more suctions cups 110. Alternatively, the flexible solar panel 120 may be mounted on side windows and/or a rear window of the EV 100. The portable solar charging unit 102 may include a first support rod 130A and/or a second support rod 130B. The flexile solar panel 120 may be fixed to first support rod 130A and/or second support rod 130B. In one embodiment, at least a portion of the flexible solar panel 120 may be wound onto second support rod 130B. The support rods 130A, 130B may include retractable rollers that may retract the flexible solar panel 120 onto one of the support rods when the panel is not in use. The retractable rollers may include one or more spring elements (not shown) that may retract the flexible solar panel 120 and wind it onto the support rod 130A, 130B. The flexible solar panel 120 may be extended to custom fit a size of a surface on which it is mounted. For example, if the flexible solar panel 120 is mounted on an interior of a front windshield 140 of the EV 100, then the flexible solar panel 120 may be extended from one end of the front windshield 140 to the other end in order to maximize efficiency of the portable solar charging unit. Depending on a size of the window, some portion of the flexible solar panel 120 may remain wound around the second support rod 130B while in use. Similarly, if the flexible solar panel 120 is installed on an interior of a rear windshield (not shown) of the EV 100, then the flexible solar panel 120 may be extended from one end of the rear windshield to the other end in order to maximize efficiency of the portable solar charging unit. Similarly, if the flexible solar panel 120 is installed on an interior of a window (not shown) of the EV 100, then the flexible solar panel 120 may be extended from a top of the window to the bottom (e.g., full height) in order to maximize efficiency of the portable solar charging unit.

The portable solar charging unit 102 may include a power cable 145. Power cable 145 may have an appropriate power rating and an appropriate power connector (not shown) to connect the flexible solar panel to a battery pack 150 of the EV 100. The power connector may include, for example, a J1772 connector, a 62196-3 connector, a 20234.3 connector, a CHAdeMO connector, or a Tesla® power connector. In some embodiments, the power cable 145 may be directly connected to the battery pack 150 using a dedicated port that may be internal to the EV. The dedicated port may be located proximate to the flexible panel 120 or it may be hidden in a trunk of the EV. The dedicated port may be connected to the battery pack 150 via one or more additional power cables. In some embodiments, the power cable 150 goes through a window of the EV and plugs into an external charging port of the EV.

In some embodiments, the portable solar charging unit 102 may include an inverter circuit that may receive power from the flexible solar panels 120 and convert direct current (DC) to alternating current (AC). In embodiments where an inverter may be used, the power connector may include, for example, a J1772 connector, a 62196-2 connector, a 20234.2 connector, or a Tesla® power connector. The power produced by the flexible solar panel 120 may be stored in one or more batteries of the battery pack 150 of the EV 100.

In some embodiments, the portable solar charging unit may plug into a charging port of the EV 100. In some embodiments, the portable solar charging unit may be directly connected to the one or more batteries of the battery pack 150 through a separate connector. The separate connector may be internal or external to the EV 100. The battery pack 150 may include a power management component 113, which will be described in further detail with respect to FIG. 9, below. The power management component 113 may include computer-executable instructions for receiving and storing power produced by the flexile solar panel 120, and providing the power to one or more components of the EV 100.

Figure 3:
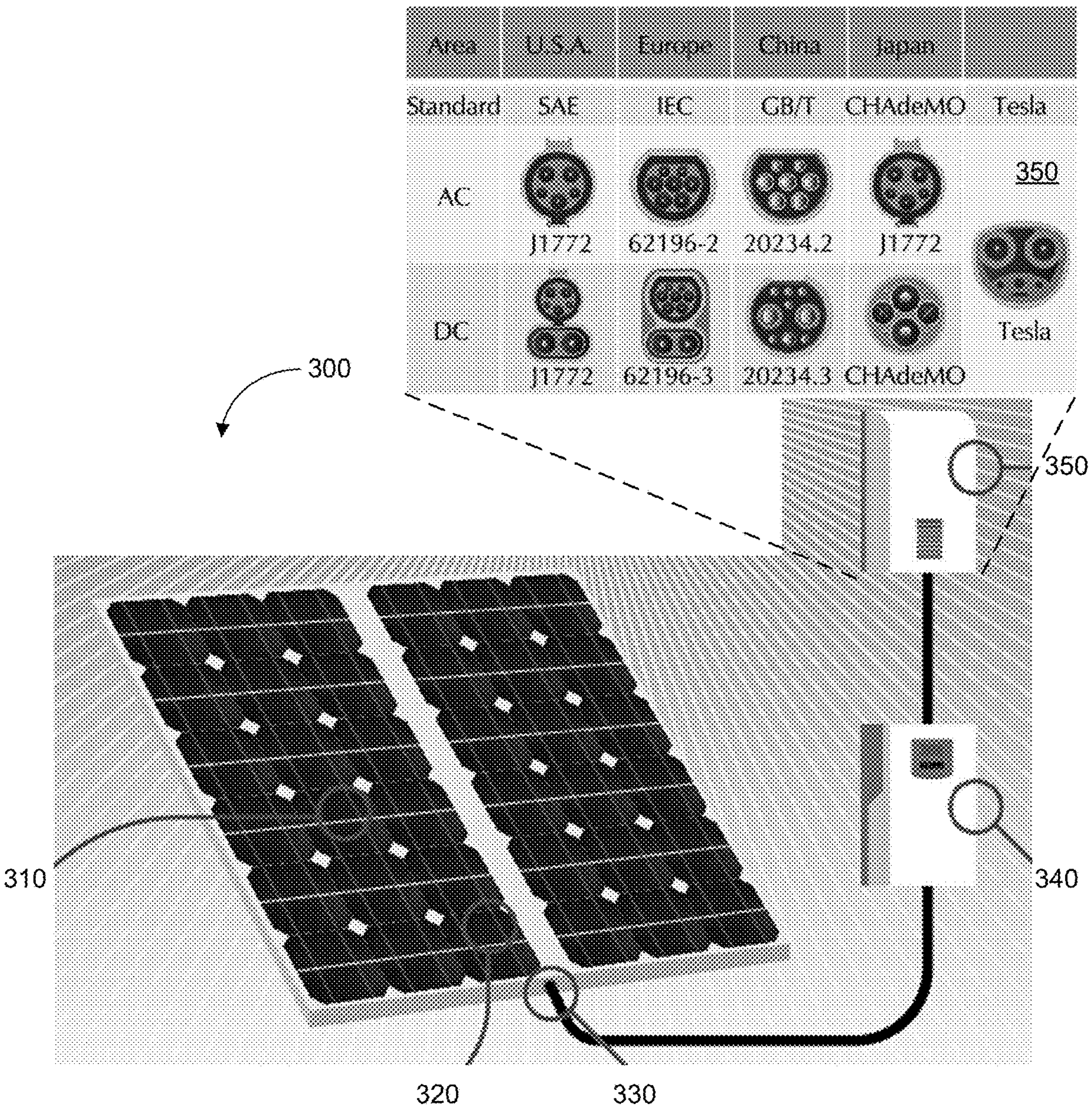
FIG. 3 is a schematic of a portable solar charging unit, according to one or more embodiments.

FIG. 3 is a schematic of a portable solar charging unit 300, according to one or more embodiments. The portable solar charging unit 300 includes one or more flexible solar panels 310. The flexible solar panel 310 may include one or more solar cells 320 that may be made of a flexible material such as polyimide, polyurethane, polyvinyl chloride, or any other polymeric material, and may include circuitry that is also made of a flexible material. The flexible solar panel 310 may include one or more solar cells 320 which may be interconnected via a series of terminals. The flexible solar panel 310 (also referred to as a photovoltaic (PV) panel) converts sunlight into electricity through a process known as the photovoltaic effect. Solar cells 320 may include two or more layers of a semiconductor material such as silicon, which may absorb sunlight when sunlight (e.g., photons) hits these cells. An example implementation of the solar cells 320 is described in further detail with respect to FIG. 4 below. When sunlight is absorbed, it excites electrons in the semiconductor material, causing them to become energized and jump to a higher energy level. This leaves behind what is referred to as "holes" in the lower energy level. As a result of the electron movement, an electric voltage is created between two layers of the solar cell. One layer is positively charged due to the presence of excess holes, while the other layer is negatively charged due to the excess of energized electrons. The voltage difference between the two layers creates an electric field. This electric field forces the energized electrons to move in a specific direction, creating an electric current, which can be harnessed by the portable solar charging unit 300. One or more metal conductive plates on the sides of the solar cell 320 collect the electric current generated by the movement of electrons. This current is then transferred to wires (also referred to as terminals) and used as electricity. In some cases, the electricity generated by a single solar cell 320 may be relatively low, so many cells are connected in series and/or parallel to form the solar panel 310. The efficiency of the solar panel, however, may be influenced by several factors, including the quality of the semiconductor material, the angle and orientation of the panel relative to the sun, and environmental conditions such as temperature and shading.

The portable solar charging unit 300 may further include an inverter 340, which may be coupled to the solar panel 310 via a suitable power cable 330. The inverter 340 may convert the direct current (DC) electricity generated by solar panel 310 into alternating current (AC) electricity that can be used to an EV (e.g., EV 100). The inverter 340 may connect to a battery pack of an EV via a power connector 350. The power connector 350 may include, for example, a J1772 connector, a 62196-3 connector, a 20234.3 connector, a CHAdeMO connector, or a Tesla® power connector. In embodiments where an inverter 340 may be used, the power connector may include, for example, a J1772 connector, a 62196-2 connector, a 20234.2 connector, or a Tesla® power connector. The power produced by the flexible solar panel 310 may be stored in one or more batteries of a battery pack of an EV. In some embodiments, the power connector 350 of the portable solar charging unit 300 may plug into a charging port of the EV. In some embodiments, the portable solar charging unit 300 may be directly connected to the one or more batteries of the battery pack through a separate connector. The separate connector may be internal or external to the EV. In some embodiments, the inverter 340 may synchronize the AC electricity it produces with the EV's frequency and voltage. This ensures that the solar-generated electricity can be seamlessly integrated with the EV. In some embodiments, the inverter 340 may include Maximum Power Point Tracking (MPPT) technology that may help optimize the energy production of the solar panels 310 by continuously tracking and adjusting the electrical load to ensure the panels are operating at their maximum power output. This may be important in some cases because solar panel output can vary due to factors like shading, temperature, and changes in sunlight intensity. In some embodiments, inverter 340 may include safety features such as overvoltage and overcurrent protection to prevent damage to the EV. Additionally, the inverter 340 may have monitoring capabilities that may allow EV owners to track the performance of the solar panels 310, including energy production and any issues that may arise. In some embodiments, the inverter 340 may include a higher efficiency inverter because they waste less energy in the conversion process (e.g., from DC to AC). Inverter 340 may include any type of inverter including but not limited to a string inverter, micro-inverter, and/or power optimizer.

Figure 4:
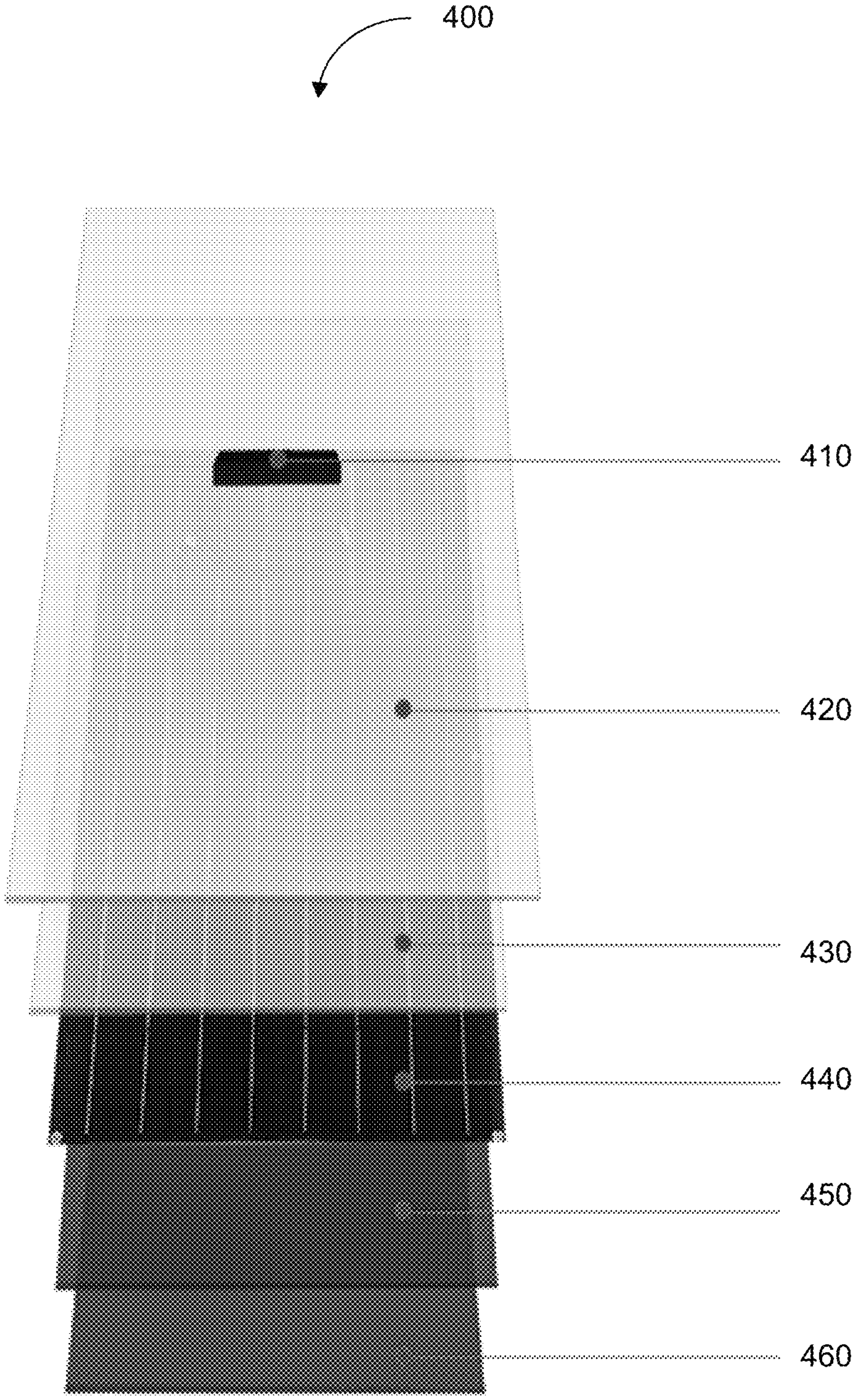
FIG. 4 illustrates an exploded view of a solar cell in a flexible solar panel, according to one or more embodiments.

FIG. 4 illustrates an exploded view of a solar cell 400 in a flexible solar panel, according to one or more embodiments. The solar cell 400 may include several layers, each with a specific function to facilitate the conversion of sunlight into electricity. In an example implementation, the solar cell 400 may include a top layer 420 having an anti-reflection coating (ARC). The top layer 420 may include a thin coating of a dielectric material on the front surface of the solar cell 400 to reduce reflection of the sunlight such that more light can penetrate into the solar cell 400, and increasing the efficiency of the solar cell 400. On top of the antireflection coating, there is a front contact 410 or grid made of metal, for example, silver or aluminum. The front contact 410 may collect the electrons generated when sunlight is absorbed by the semiconductor material, and provide a pathway for these electrons to exit the solar cell 400 and be used as electricity. The solar cell 400 may further include a semiconductor absorption layer 440 beneath the front contact 410. The semiconductor absorption layer 440 may include any semiconductor material, such as silicon. When photons from sunlight strike the semiconductor absorption layer 440, they create electron-hole pairs by exciting electrons in the semiconductor material, resulting in the photovoltaic effect. The solar cell 400 may further include a rear contact on the back of the solar cell 400, which may be made of a metal (e.g., aluminum). The rear contact may collect the holes (e.g., positively charged carriers) generated by the electron-hole pairs created in the semiconductor layer 440. Similar to the front contact 410, rear contacts provide a pathway for these holes to exit the solar cell 400. The solar cell 400 may further include a back surface field (BSF) or rear emitter layer 450 which may include a highly doped material on a rear surface of the solar cell 400. The rear emitter layer 450 may be located on the back side of the semiconductor absorption layer 440, is designed to improve the collection of charge carriers (e.g., electrons or holes) and enhance the overall efficiency of the solar cell 400. The solar cell 400 may further include a passivation layer 460. The passivation layer 460 may include a thin dielectric material to reduce surface recombination of charge carriers. This layer 460 may help prevent the loss of electrons and holes at the surface of the cell 400.

In some embodiments, the solar cell 400 may include a back surface reflective layer (not shown). The back surface reflective layer may be added to the back surface of the solar cell 400 to reflect any light that passed through the semiconductor layer 440 without being absorbed. This reflected light can then have another chance to be absorbed by the semiconductor material in the layer 440, increasing the solar cell's efficiency. In some embodiments, the solar cell 400 may include silicon solar cells, including monocrystalline and polycrystalline cells. In some embodiments, the solar cell 400 may include thin-film and multi-junction solar cells that have different layer structures to achieve high efficiency with different materials. In some embodiments, the solar cell 400 may include a first layer (e.g., layer 420) including ethylene tetrafluoroethylene. In some embodiments, the solar cell 400 may include a second layer (e.g., layer 430) including a first ethylene vinyl acetate film. In some embodiments, the solar cell 400 may include a third layer (e.g., layer 440) including one or more layers of a semiconductor material. In some embodiments, the solar cell 400 may include a fourth layer (e.g., layer 450) including a second ethylene vinyl acetate film. In some embodiments, the solar cell 400 may include a fifth layer (e.g., layer 460) including a Tedlar® polyester Tedlar® (TPT) back sheet. Tedlar® is a brand of flexible polyvinyl fluoride (PVF) material made by DuPont™. In some embodiments, the solar cell 400 may include a full passivated emitter rear cell (PERC), a half PERC, or a quarter PERC. In some embodiments, the solar cell 400 has a rated output of at least 200 watts per square feet or more.

Figure 5:
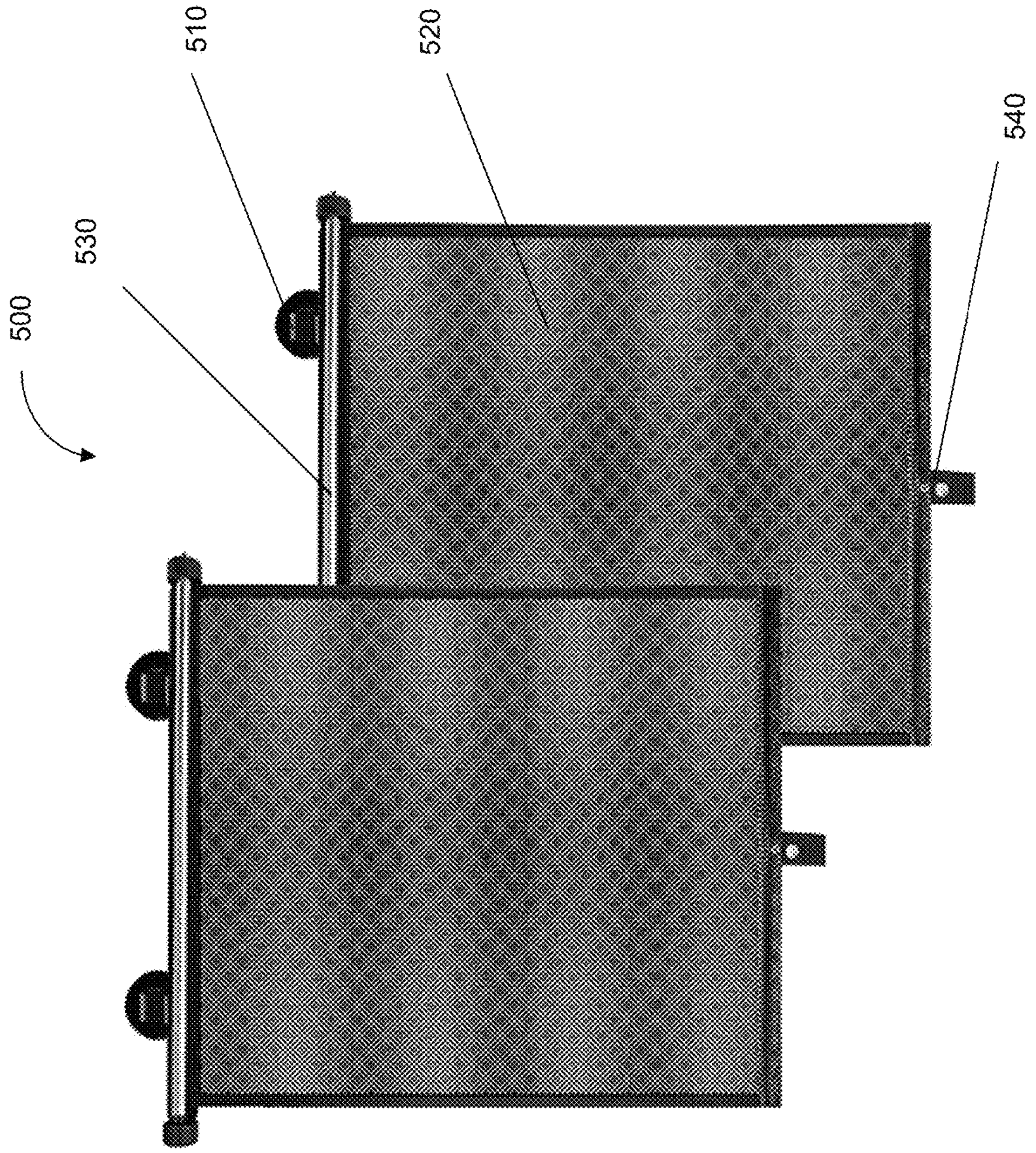
FIG. 5 illustrates one embodiment of a flexible solar panel in a portable solar charging unit, according to one or more embodiments.

FIG. 5 illustrates one embodiment a portable solar charging unit 500 including a flexible solar panel 520, according to one or more embodiments. The portable solar charging unit 500 may include one or more retractable rollers 530 that may be attached to at least a portion of the flexible solar panel 520. The retractable rollers 530 may include a metal rod, a plastic rod, a polymeric material, a composite material including a polymeric material and reinforcing material, or combination thereof. The flexible solar panel 520 may be attached to one of the retractable rollers 530 and may be rolled up against this roller 530 when the solar panel 520 is not in use. In some embodiments, the retractable rollers 530 may include one or more spring elements that may have a variable tension to hold the solar panel 520 in a rolled-up position. In some embodiments, one edge of the flexible solar panel 520 may form a loop and the loop may be inserted into a longitudinal slit formed in the roller 530. A metal rod or plastic rod may be inserted to attach the flexible solar panel 520, temporarily or permanently, to the retractable roller 530. The diameter and height of the retractable rollers 530 may be such that the flexible solar panel 520 may be rolled up against the one or more retractable rollers when the solar panel 520 not in use. In some embodiments, the retractable rollers 530 may include actuators that may roll up or roll down the flexible solar panel 520 through a push of a button.

In some embodiments, the actuators may include an Internet of Things (IoT) device which may be controlled remotely. The portable solar charging unit 500 may further include one or more mounting units 510, which may be temporarily or permanently attached to the retractable rollers 530. In some embodiments, the mounting units 510 may be used to mount the flexible solar panel 520 onto an interior of a front windshield, a rear windshield, and/or the windows of an EV. In some embodiments, the mounting units 510 may include a suction cup. In some embodiments, the mounting units 510 may include a metal grommet, a Velcro® brand hook and loop fastener, a hook, or combinations thereof.

In the embodiment illustrated in FIG. 5, a pull-out component 540 such as a hook may be attached to one edge of the flexible solar panel 520 such that the flexible solar panel 520 may be fully or partially extended when the portable solar charging unit 500 is in use. In some embodiments, the pull-out component 540 may include a metal grommet, a Velcro® brand hook and loop fastener, a suction cup, or combinations thereof. In some embodiments, the portable solar charging unit 500 may include two or more flexible solar panels 520, which may be connected in series to increase productivity and efficiency. For example, one panel may be installed on the front windshield, one panel may be installed on the rear windshield, one panel may be installed on each of the windows, and so and so forth. The two or more panels 520 may be connected using power cables with male-female connectors. In some embodiments, each of these panels may connect to a battery pack separately. In some embodiments, all of these panels may be connected in series and the collective power may be supplied to the battery pack.

Figure 6:
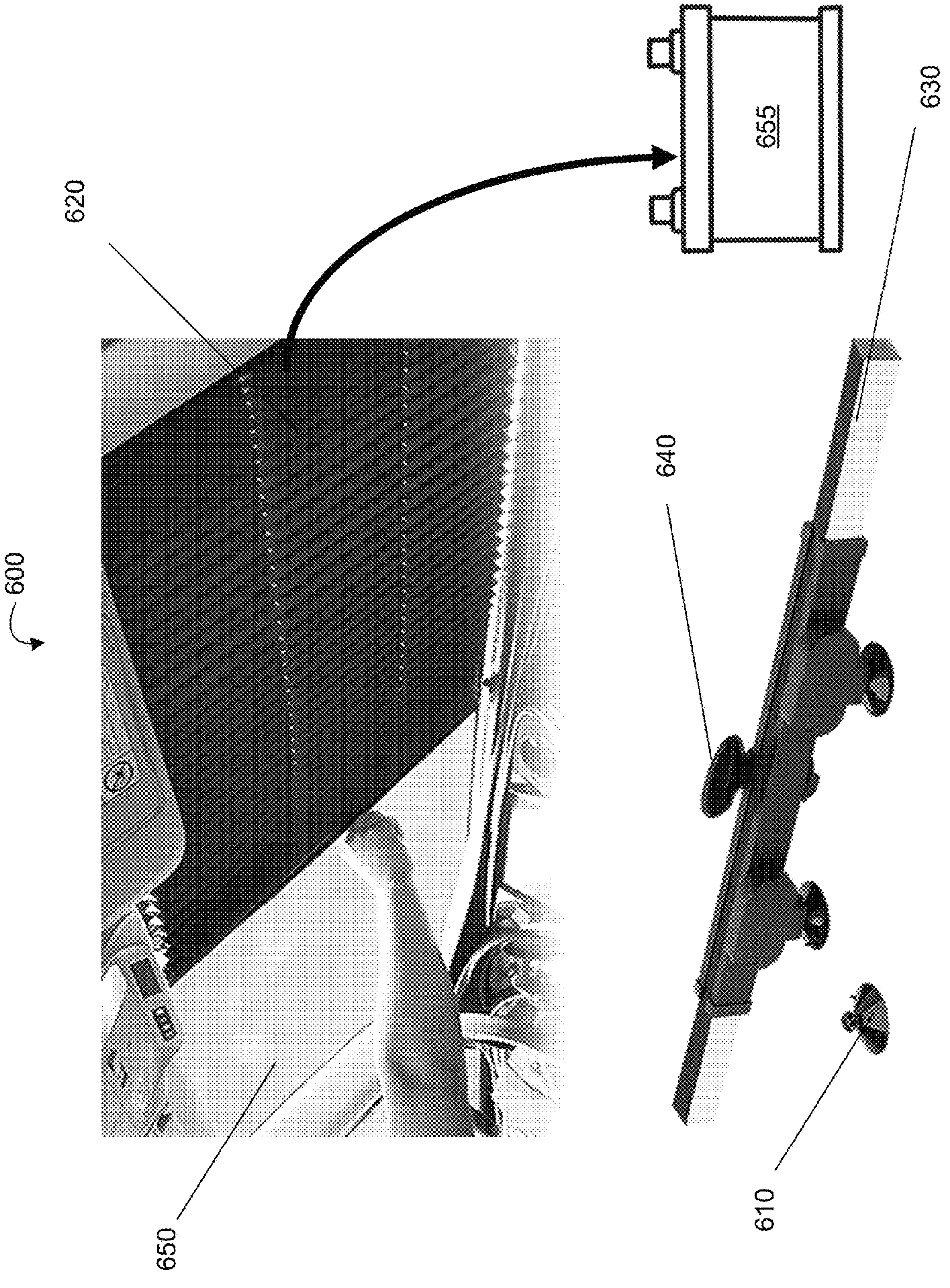
FIG. 6 illustrates one embodiment of a flexible solar panel in a portable solar charging unit, according to one or more embodiments.

FIG. 6 illustrates one embodiment a portable solar charging unit 600 including a flexible solar panel 620, according to one or more embodiments. The flexible solar panel 620 may have a bellow structure such that the flexible solar panel 620 may be stretched, either up to the entire width of the windshield or at least partially, when the portable solar charging unit 600 is in use. Similarly, the flexible solar panel 620 can be folded away to one side of the windshield when not in use so that the EV user has a clear view through the windshield. The portable solar charging unit 600 may include one or more retractable support rods 630 that may be attached to at least a portion of the flexible solar panel 620. The retractable support rods 630 may include a metal rod, a plastic rod, a polymeric material, a composite material including a polymeric material and reinforcing material, or combination thereof. The diameter and height of the retractable support rods 630 may be such that the flexible solar panel 620 may be compacted against the one or more retractable support rods when the solar panel 620 is not in use. In some embodiments, the retractable support rods 630 may include actuators that may expand or roll out the flexible solar panel 620 through a push of a button. In some embodiments, the portable solar charging unit 600 may include a mounting bracket that may be permanently or temporarily fixed to the windshield or the rear window of the EV. The flexible solar panel 620 may have a bellow structure such that it is unrolled when in use (when the EV is in park position) and folded up into a compact structure when not in use. The mounting bracket may include one or more parallel rails to expand the solar panel 620 when in use (when the EV is in park position) and folded up into a compact structure when not in use. In some embodiments, the actuators may include an Internet of Things (IoT) device which may be controlled remotely. The portable solar charging unit 600 may further include one or more mounting units 610, which may be temporarily or permanently attached to the retractable rollers 630. In some embodiments, the mounting units 610 may be used to mount the flexible solar panel 620 onto an interior of a front windshield 650, a rear windshield, and/or the windows of an EV. In some embodiments, the mounting units 610 may include a suction cup. In some embodiments, the mounting units 610 may include a metal grommet, a Velcro® brand hook and loop fastener, a hook, or combinations thereof. In the embodiment illustrated in FIG. 6, a pull-out component 640 such as a hook or gripper may be attached to one edge of the flexible solar panel 620 such that the flexible solar panel 620 may be fully or partially extended when the portable solar charging unit 600 is in use. In some embodiments, the pull-out component 640 may include a metal grommet, a Velcro® brand hook and loop fastener, a suction cup, or combinations thereof. In some embodiments, the portable solar charging unit 600 may include two or more flexible solar panels 620, which may be connected in series to increase productivity and efficiency. For example, one panel may be installed on the front windshield 650, one panel may be installed on the rear windshield, one panel may be installed on each of the windows, and so and so forth. In some embodiments, each of these panels may connect to a battery pack 655 separately. In some embodiments, all of these panels may be connected in series and the collective power may be supplied to the battery pack 655.

Figure 7:
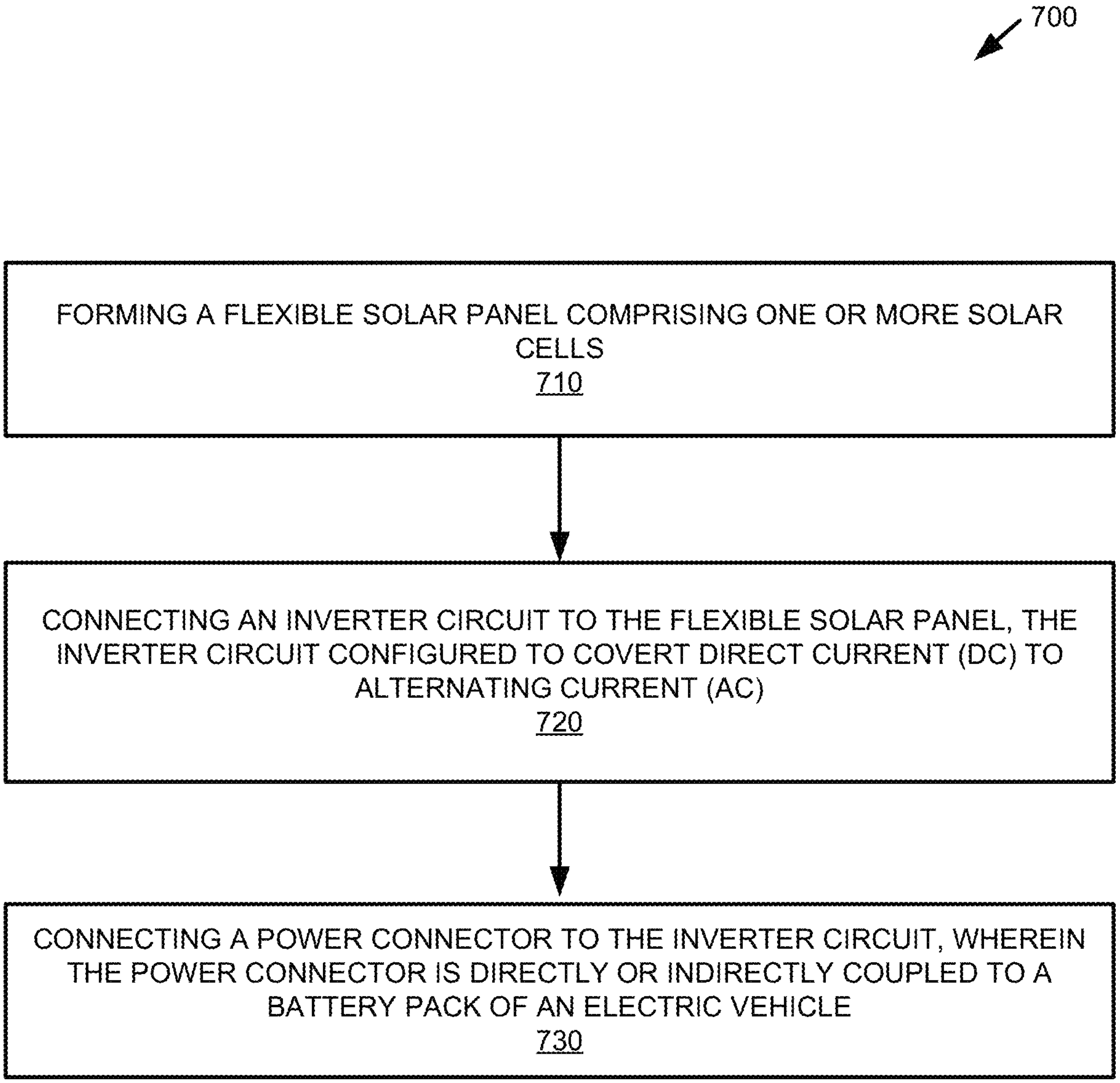
FIG. 7 illustrates example operations in a method for forming a portable solar charging unit, according to one or more embodiments.

FIG. 7 illustrates example operations in a method 700 for forming a portable solar charging unit, according to one or more embodiments. At block 710, the method 700 may include forming a flexible solar panel including one or more solar cells. The flexible solar panel may be formed by individually forming the layers of the solar cells and bonding them together with or without a bonding layer. For example, the solar cells may be formed by forming a top layer including ethylene tetrafluoroethylene. In some embodiments, the method 700 may include forming a top intermediate layer including a first ethylene vinyl acetate film. In some embodiments, the method 700 may include forming a center layer including one or more semiconductor materials. In some embodiments, the method 700 may include forming a bottom intermediate layer including a second ethylene vinyl acetate film. In some embodiments, the method 700 may include forming a bottom back layer including a TPT back sheet. The different layers of the solar cells may be bonded, either with or without a bonding layer, to form a composite solar cell. The solar cells include at least one of a full passivated emitter rear cell (PERC), a half PERC, or a quarter PERC. At block 720, the method may include connecting an inverter circuit (e.g., inverter 430) to the flexible solar panel. The inverter circuit may be configured to convert direct current (DC) to alternating current (AC). At block 730, the method 700 may include connecting a power connector to the inverter circuit. The power connector may be configured to mate with a charging port of an electric vehicle. In some embodiments, the power connector may be configured to directly connect with a battery pack of the EV. The battery pack may store and provide electrical energy to power the EV's electric motor(s) and other electrical systems. In some embodiments, the battery pack may include numerous individual battery cells. For example, the battery cells may include lithium-ion battery due to its high energy density, durability, and relatively lightweight nature. Each lithium-ion battery cell may include two electrodes—an anode and a cathode—separated by an electrolyte. When charging, lithium ions move from the cathode to the anode through the electrolyte, and during discharging (when powering the EV), they move from the anode to the cathode, creating an electrical current.

The battery pack may include a battery management system (BMS) (e.g., power management component 113) that monitors and manages the individual cells within the battery pack. The BMS ensures that the cells are charged and discharged safely and evenly to maximize the pack's performance, efficiency, and lifespan. It also monitors temperature, voltage, and state of charge to prevent overcharging or over-discharging, which could damage the cells. The individual cells within the battery pack may be connected in series and parallel configurations to achieve the desired voltage and capacity for the EV. This voltage and capacity determine the total energy storage capacity of the battery pack and the vehicle's range. When the portable solar charging unit is plugged into the EV, electricity flows into the battery pack. During charging, the lithium ions move from the cathode to the anode, storing energy in the battery cells. Charging speed and voltage levels can vary depending on the charger type and the vehicle's specifications. When the vehicle is in operation, the BMS controls the release of stored energy from the battery pack. The lithium ions move from the anode to the cathode, creating an electrical current that powers the electric motor(s) and other vehicle systems. In some embodiments, the EV may incorporate cooling and thermal management systems to maintain the battery cells within a safe temperature range since overheating can reduce performance and lifespan, and extreme temperatures can be hazardous. Additionally, the vehicle's onboard computer system may manage the power flow between the battery pack, electric motor(s), and other vehicle systems to optimize efficiency, performance, and safety.

In some embodiments, the method may further include attaching one or more retractable rollers to at least a portion of the flexible solar panel. The flexible solar panel may be rolled up against the one or more retractable rollers when not in use. In some embodiments, the method may further include attaching one or more mounting units to the one or more retractable rollers. The one or more mounting units configured to mount the flexible solar panel inside the electric vehicle.

Figure 8:
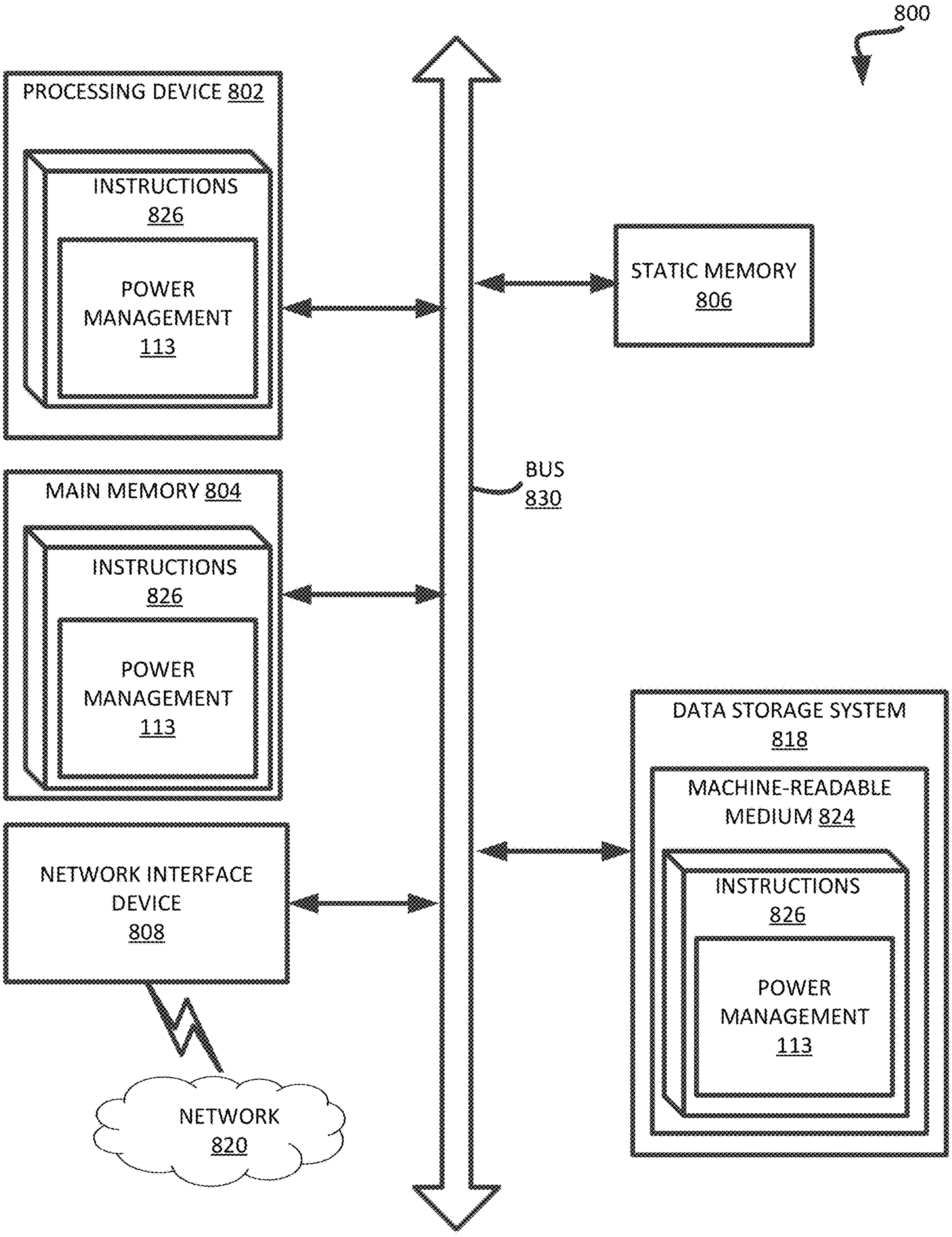
FIG. 8 is a schematic of an example computer system in communication with a portable solar charging unit, according to one or more embodiments.

FIG. 8 illustrates an example machine of a computer system 800 within which a set of instructions, for causing the machine to perform any one or more of the methodologies discussed herein, can be executed. In some embodiments, the computer system 800 can correspond to an inverter (e.g., inverter 340), an actuator that may be used to control the retractable rollers (e.g., rollers 530, 630), or a processor that may be used to control a battery pack (e.g., battery pack 150, 655). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. For example, processing device 802 may be configured to execute instructions 826 for receiving power from the portable charging unit (e.g., unit 300, 600), storing the power in one or more batteries of the battery pack (e.g., battery pack 150, 655), and providing the stored power to one or more motors of the EV. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the inverter 340 of FIG. 3.

In one embodiment, the instructions 826 include instructions to implement functionality corresponding to power management component 113 of FIG. 2. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as hardware including a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A portable solar charging unit comprising:

a flexible solar panel comprising one or more solar cells;

an inverter circuit operatively coupled to the flexible solar panel, the inverter circuit configured to convert direct current (DC) to alternating current (AC);

a power cable operatively coupled with the inverter circuit, wherein the power cable comprises a power connector that is configured to mate with a charging port of an electric vehicle, and wherein the charging port is configured to charge a battery pack of the electric vehicle that is configured to store electrical energy capable of being used by an electric motor of the electric vehicle to propel the electric vehicle;

one or more retractable rollers attached to at least a portion of the flexible solar panel, wherein the flexible solar panel is rolled up against the one or more retractable rollers when not in use, and wherein the flexible solar panel has a bellow structure configured to be stretched when the portable solar charging unit is in use and folded into a compact structure when not in use; and one or more mounting units attached to the one or more retractable rollers, the one or more mounting units being configured to mount the flexible solar panel inside the electric vehicle and on at least one of a: windshield, a side window or a rear window.

2. The portable solar charging unit of claim 1, wherein the one or more retractable rollers comprise a metal rod or a plastic rod to which the portion of the flexible solar panel is attached.

3. The portable solar charging unit of claim 1, wherein the one or more mounting units comprise at least one of a suction cup, a metal grommet, a hook and loop fastener, or a hook.

4. The portable solar charging unit of claim 1, wherein the flexible solar panel further comprises:

a first layer comprising ethylene tetrafluoroethylene;

a second layer comprising a first ethylene vinyl acetate film;

a third layer comprising the one or more solar cells;

a fourth layer comprising a second ethylene vinyl acetate film; and a fifth layer comprising a back sheet comprising polyester.

5. The portable solar charging unit of claim 1, wherein the one or more solar cells comprise at least one of a full passivated emitter rear cell (PERC), a half PERC, or a quarter PERC.

6. The portable solar charging unit of claim 1, wherein the one or more solar cells comprise monocrystalline silicon.

7. The portable solar charging unit of claim 1, wherein the one or more solar cells have a rated output of at least 200 watts per square feet or more.

8. The portable solar charging unit of claim 1, wherein the power connector comprises a J1772 connector, a 62196-3 connector, a 20234.3 connector, or a CHAdeMO connector.

9. A method comprising:

forming a flexible solar panel of a portable solar charging unit, the flexible solar panel comprising one or more solar cells;

connecting an inverter circuit of the portable solar charging unit to the flexible solar panel, the inverter circuit being configured to convert direct current (DC) to alternating current (AC);

connecting a power cable of the portable solar charging unit to the inverter circuit, the power cable comprising a power connector that is configured to mate with a charging port of an electric vehicle, wherein the charging port is configured to charge a battery pack of the electric vehicle that is configured to store electrical energy capable of being used by an electric motor of the electric vehicle to propel the electric vehicle;

attaching one or more retractable rollers of the portable solar charging unit to at least a portion of the flexible solar panel, wherein the flexible solar panel is rolled up against the one or more retractable rollers when not in use, and wherein the flexible solar panel has a bellow structure configured to be stretched when the portable solar charging unit is in use and folded into a compact structure when not in use; and attaching one or more mounting units of the portable solar charging unit to the one or more retractable rollers, the one or more mounting units being configured to mount the flexible solar panel inside the electric vehicle and on at least one of a: windshield, a side window or a rear window.

10. The method of claim 9, wherein forming the flexible solar panel further comprises:

forming a top layer comprising ethylene tetrafluoroethylene;

forming a top intermediate layer comprising a first ethylene vinyl acetate film;

forming a center layer comprising the one or more solar cells;

forming a bottom intermediate layer comprising a second ethylene vinyl acetate film; and forming a bottom back layer comprising a back sheet comprising polyester.

11. The method of claim 9, wherein the one or more solar cells comprise at least one of a full passivated emitter rear cell (PERC), a half PERC, or a quarter PERC.

12. The method of claim 9, wherein the power connector comprises a J1772 connector, a 62196-3 connector, a 20234.3 connector, or a CHAdeMO connector.

13. An apparatus comprising:

an electric vehicle comprising:

an electric motor;

a battery pack configured to store electrical energy capable of being used by the electric motor to propel the electric vehicle; and a charging port operatively coupled to the battery pack; and a portable solar charging unit configured to be directly or indirectly coupled to a battery pack of the electric vehicle, the portable solar charging unit comprising:

a flexible solar panel comprising one or more solar cells;

an inverter circuit operatively coupled to the solar panel, the inverter circuit configured to convert direct current (DC) to alternating current (AC);

a power cable operatively coupled with the inverter circuit, wherein the power cable comprise a power connector that is configured to mate with the charging port of the electric vehicle in order to charge the battery pack;

one or more retractable rollers attached to at least a portion of the flexible solar panel, wherein the flexible solar panel is rolled up against the one or more retractable rollers when not in use, and wherein the flexible solar panel has a bellow structure configured to be stretched when the portable solar charging unit is in use and folded into a compact structure when not in use; and one or more mounting units attached to the one or more retractable rollers, the one or more mounting units being configured to mount the flexible solar panel inside the electric vehicle and on at least one of a: windshield, a side window or a rear window.

14. The apparatus of claim 13, wherein the one or more mounting units comprise at least one of a suction cup, a metal grommet, a hook and loop fastener, or a hook.

15. The apparatus of claim 13, wherein the one or more solar cells comprise at least one of a full passivated emitter rear cell (PERC), a half PERC, or a quarter PERC, or a monocrystalline silicon.

16. The apparatus of claim 13, wherein the one or more solar cells have a rated output of at least 200 watts per square feet or more.

17. The apparatus of claim 13, wherein the flexible solar panel further comprises:

a first layer comprising ethylene tetrafluoroethylene;

a second layer comprising a first ethylene vinyl acetate film;

a third layer comprising the one or more solar cells;

a fourth layer comprising a second ethylene vinyl acetate film; and a fifth layer comprising a back sheet comprising polyester.

18. The apparatus of claim 13, wherein the power connector comprises a J1772 connector, a 62196-3 connector, a 20234.3 connector, or a CHAdeMO connector.

* * * * *